No. 711,436. Patented Oct. 14, 1902.
J. C. McCLENAHAN.
PROCESS OF MANUFACTURING STONE.
(Application filed Feb. 13, 1901.)
(No Model.)
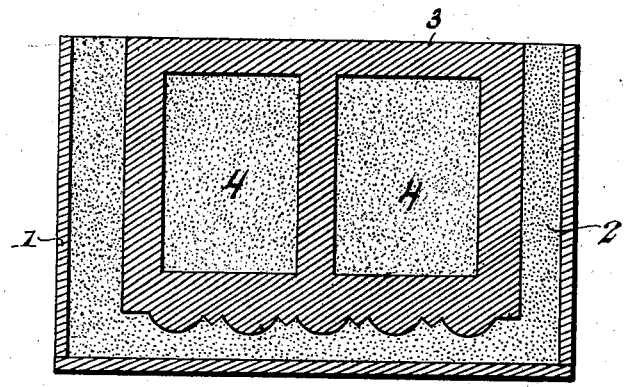
Witnesses
Edwin G. McKee.
B. F. Punk.
Inventor
Jacob C. McClenahan
By Victor J. Evans
Attorney

UNITED STATES PATENT OFFICE.

JACOB C. McCLENAHAN, OF COLDWATER, MICHIGAN.

PROCESS OF MANUFACTURING STONE.

SPECIFICATION forming part of Letters Patent No. 711,436, dated October 14, 1902.

Application filed February 13, 1901. Serial No. 47,178. (No specimens.)

*To all whom it may concern:*

Be it known that I, JACOB C. MCCLENAHAN, a citizen of the United States, residing at Coldwater, in the county of Branch and State of Michigan, have invented new and useful Improvements in Processes of Manufacturing Stone, of which the following is a specification.

This invention relates to a new process of making stone, and has for its object the prevention of the cracking of the stone in its course of manufacture and the solidifying and tempering of the same, thus furnishing a finished product possessing superior qualities over the stone heretofore produced.

Further objects of the invention, as well as the manner of accomplishing the desired result, will be fully explained in the process hereinafter described and claimed.

In order that my invention may be fully understood, I will proceed to describe it with reference to the accompanying drawing, which shows a vertical section of a mold in which my improved process may be carried out.

1 represents a flask or mold; 2, the molding material; 3, the stone composition, and 4 a core in the mold utilized when a hollow product is produced.

In order to convey a clear idea of the nature and characteristics of the materials that enter into the formation of the stone and the chemical changes that occur by the application of a solution which I have found by experiment to be efficient in producing a stone of merit and commercial value, I will explain briefly the component parts of the stone compound or mixture and the various steps employed by me in producing the finished product. The porosity of the ordinary artificial stone induces the absorption of moisture, the presence of which dissolves the soluble constituents remaining in the stone, such as uncombined lime and alkaline salts, which are carried to the surface and eventually appear as stains, which deface the stone and become a serious obstacle to its use for ornamentation and its selection for building purposes. By the practice of my improved process a stone is produced which is substantially impervious to moisture, because these deleterious elements are practically eliminated during the process of mixture and that taking effect during the incorporation of the hardening material. The first step in the production of a stone by my process is to prepare the material constituting the mold. The porosity of this material must be such as to enable sufficient storage of my chemical solution and permit the absorption and transference of the hardening material from the mold material to the stone mixture, and thus effect the proper hydration and crystallization of the stone material. I find that a fine white glass-sand is practical for this purpose, and this I saturate with my chemical solution consisting of sulfuric acid, alum, and lime-water. I then take this sand and tamp it upon a pattern within a box or flask, withdraw the pattern, and thus secure an exact impression of the style, size, contour, or configuration of the stone I wish to produce. I next prepare the stone compound or mixture, and in doing this I use only the best Portland cement and combine with this an amount of good clean dry sharp sand in such proportion as may be necessary to produce the kind of stone required. For the best quality of stone I use two pounds of cement to five pounds of sand; but this can be varied as necessity may require, and after this composition is thoroughly mixed dry I add clean water gradually sufficient to make what might be termed "reasonably thin" mortar. This is thoroughly "worked" in this plastic condition, so that every particle or atom of sand is surrounded or enveloped, as it were, with the molecules of the cement. I then add sufficient water to make a very thin liquid, thoroughly worked or agitated, so that the air is forced out of the composition, leaving a homogeneous mass of liquid material. I then pour this liquid material into the mold prepared for this purpose. The tendency of this thin material is to penetrate every atom of space in the mold and produce a stone with a very smooth even surface, very solid and compact and free from air-bubbles and other defects seen on stone where the material is used in a plastic or semiliquid state and run or forced into a mold. In casting stone of large size the exposed face or faces of the block may be made of fine material such as I have described and backed up with a "poorer" material—say one pound of cement and five or six pounds of sand, gravel, or ground rock, as the case may be. In casting blocks of large size it is best to make them hollow, and this can be very readily done by the use of a porous chemically-saturated core prepared in the same manner as the walls of the mold, and where possible it is advisable to do so, as it lightens and cheapens the stone without sacrificing either its strength or durability.

Instead of using natural sand as a base for my stone compound I have used similar proportions of pulverized quartz-rock, granite, or sharp sandstone, which produce equally good and in some cases better results. Any good silicious material, however, properly united with the best Portland cement will produce a stone so closely resembling natural stone that experts fail to tell the difference. The inherent difference, however, that does exist is in favor of the manufactured product. The fineness of grain, great tensile and crushing strength, tenacity and hardness, and slight tendency to absorb moisture make it practically indestructible and superior in many respects to any natural stone.

In preparing the stone compound according to my process there seems to be created a very close affinity between the molecules of the materials forming the compound. It maintains its limpid consistency while being poured into the mold and does not contract or expand after the initial set has taken place— a defect it has been found difficult to overcome heretofore. After remaining in the chemically-saturated mold from ten to thirty hours the decomposing solution has thoroughly penetrated every part of the stone, almost complete crystallization or petrifaction has taken place, the pores are effectually closed, and after a few days' exposure in the open air the stone is ready for use. During the process of creation and induration the facings of the mold will more or less adhere to and become incorporated in the stone, and this residual hardening material is then removed from the face of the stone after the stone has been cured. No expensive machinery, hydraulic presses, costly furnaces, large consumption of time, and frequent handling nor expert labor having been required to bring about this simple but efficient result. In connection with the chemical solution contained within the mold should it be found desirable to color the stone in imitation of natural rock any of the well-known mineral pigments may be incorporated in the hardening solution, and while the solution permeates the compound the color is being carried with the solution into the stone, and thereby produces the desired result.

In order that others skilled in the art to which my invention pertains may make and use the same, I have specifically described the method as well as the materials employed. However, I would have it understood that I reserve the right to utilize any other liquid medium which might suggest itself without departing from or sacrificing any of the advantages of the invention.

Having thus described my invention, the following is what I claim as new therein and desire to secure by Letters Patent:

1. The herein-described process of making stone which consists in molding a liquid stone composition in the presence of a hardening chemical solution and leaving it to set while absorbing the chemical solution and thus becoming hardened.

2. The herein-described process of making stone which consists in saturating a molding material with a hardening chemical solution and then pouring a liquid stone composition onto the saturated molding material and leaving the stone composition to set while absorbing the hardening chemical solution and thus becoming hardened.

3. The herein-described process of making stone which consists in saturating porous molding material with a hardening chemical solution and then pouring liquid stone composition onto the saturated molding material and leaving the stone composition to set while absorbing the hardening chemical solution and thus becoming hardened.

4. The herein-described process for making stone which consists in saturating a silicious molding material with a hardening chemical solution and then pouring a liquid stone composition onto the saturated molding material and leaving the stone composition to set while absorbing the hardening chemical solution and thus becoming hardened.

5. The herein-described process of making stone which consists in saturating hardening granulated molding material with a hardening chemical solution and then pouring a liquid stone composition onto the saturated molding material and leaving the stone composition to set, and take up a facing or coating of the molding material while absorbing the chemical solution and thus becoming hardened.

6. The herein-described process of making stone which consists in saturating a molding material containing coloring-pigments with a chemical solution and then pouring a liquid stone composition onto the saturated molding material and leaving the stone composition to set and take up the coloring-pigments while absorbing the chemical solution and thus becoming hardened.

7. The herein-described process of making stone which consists in molding a stone composition in the presence of a chemical solution consisting of sulfuric acid, alum, and lime-water, and leaving it to set while absorbing the chemical solution and thus becoming hardened.

8. The herein-described process of making stone which consists in saturating a molding material and a core material with a hardening chemical solution and then pouring a liquid stone composition between the saturated molding material and saturated core material and leaving the stone composition to set while absorbing the hardening chemical solution and thus becoming hardened.

9. An improved process for the manufacture of stone, which consists in providing a mold with a face containing hardening material, filling the mold with stone mixture against the hardening material, and removing the residual hardening material from the face of the stone after the stone is cured.

10. An improvement in the manufacture of artificial stone, which consists in providing a mold with a coating of sand moistened with a hardening liquid, filling the mold with a stone mixture, and removing the residual coating after the stone is cured.

11. The herein-described process of making stone which consists in saturating granulated molding material with a chemical solution, and then pouring a liquid stone composition onto the saturated molding material and leaving the stone composition to set, and taking up a facing or coating of the molding material, and while absorbing the chemical solution and thus becoming hardened.

In testimony whereof I affix my signature in presence of two witnesses.

JACOB C. McCLENAHAN.

Witnesses:
  HUGH M. STERLING,
  C. G. HIGHAM.